UNITED STATES PATENT OFFICE.

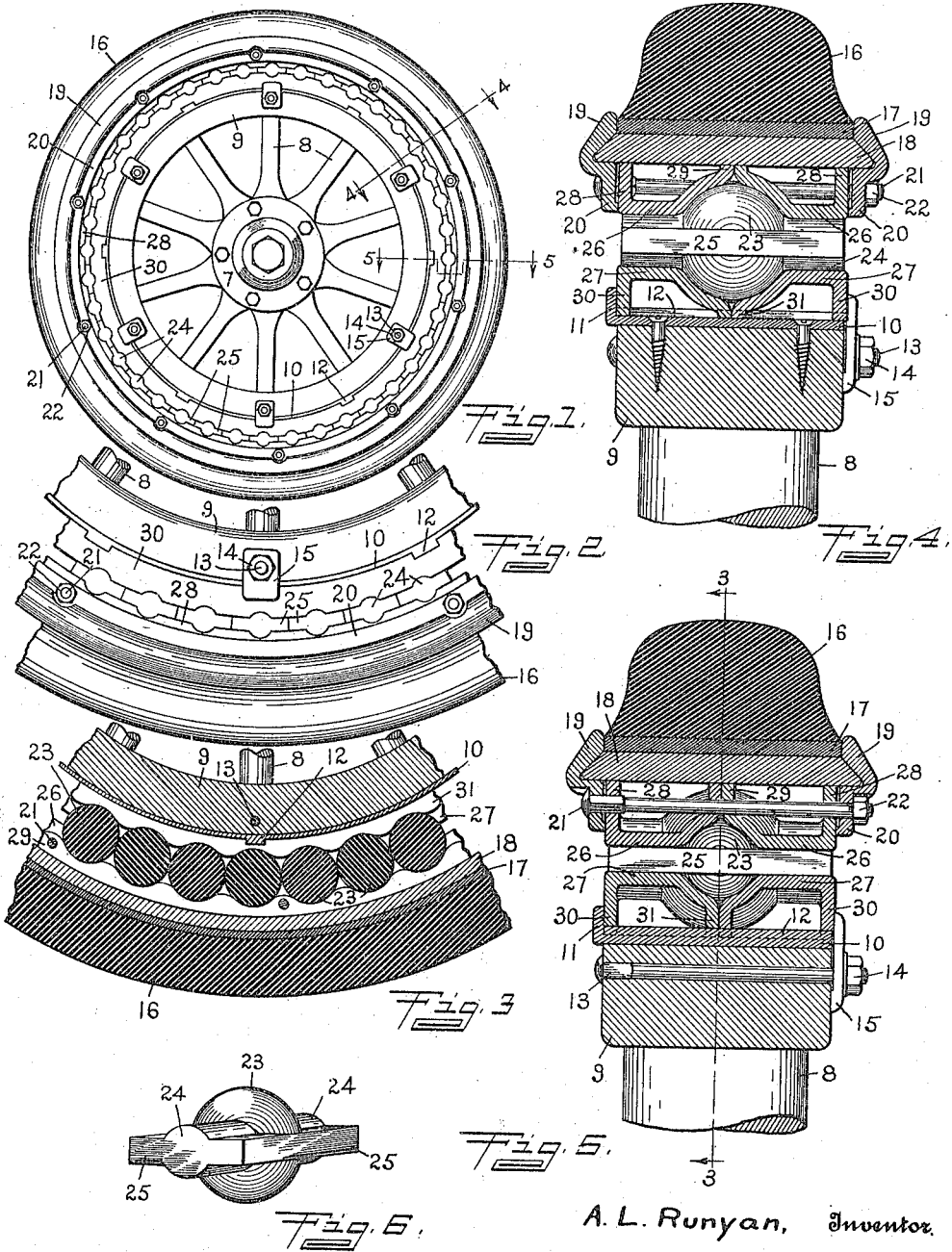

ARTHUR L. RUNYAN, OF WATERLOO, IOWA, ASSIGNOR TO RUNYAN CUSHION WHEEL COMPANY, OF OMAHA, NEBRASKA, A CORPORATION.

RESILIENT TIRE.

1,221,381. Specification of Letters Patent. Patented Apr. 3, 1917.

Application filed December 28, 1915. Serial No. 69,124.

*To all whom it may concern:*

Be it known that I, ARTHUR L. RUNYAN, a citizen of the United States, and a resident of Waterloo, in the county of Blackhawk and State of Iowa, have invented certain new and useful Improvements in Resilient Tires, of which the following is a specification.

My invention relates to the general class of resilient tires and wheels, and it is the object thereof to provide a tire for vehicle wheels, especially adapted for use on motor-trucks and like heavy vehicles, and having in combination a resilient tread-member and a confined inner tire-body of compressed resilient material, whereby there may be attained a resilience and shock-absorbing capacity substantially equivalent to that of a pneumatic tire, together with a durability such as to enable economical use of the tire for heavy vehicles. Further objects of my invention relate to the specific means for assembling and holding the elements of the inner tire-body under compression, and for renewing the parts when worn, as will be fully set forth hereinafter.

In the accompanying drawings, Figure 1 is a side view of a wheel provided with a tire embodying my invention, Fig. 2 is a similar view of a portion of the same drawn to a larger scale, Fig. 3 is a detail section on the plane of the line 3—3 of Fig. 5, Fig. 4 is a transverse section on the plane of the line 4—4 of Fig. 1, the resilient block lying in the plane of section not being cut, Fig. 5 is a detail transverse section on the plane of the line 5—5 of Fig. 1, and Fig. 6 is a perspective view of one of the units or resilient blocks which form the inner tire-body.

In carrying out my invention I employ any suitable wheel; that shown in the drawing comprising a hub 7, spokes 8, and a felly 9, the latter having secured on the periphery thereof a metal rim 10 which is provided at one side with a flange 11 extending radially outward. On the outer surface of the rim 10 there are also provided a plurality of rectangular lugs or ribs 12 which extend across the rim parallel with the wheel-axis. At several points bolts 13 pass transversely through the felly 9, said bolts having heads at the inner side of the wheel adjacent to the flange 11, and at the outer side being provided with nuts 14 and washers 15, the latter projecting beyond the adjacent portions of the rim 10 and being employed in securing the inner retaining-rings of the tire upon the wheel.

The outer or tread-portion of my tire is preferably identical with a solid rubber tire of standard form and construction, the same comprising a tread-body 16 of moderately resilient rubber or rubber composition affixed to and integral with a band 17 of harder rubber composition, the latter, in turn, being permanently secured onto a metal rim 18 by suitable interengaging parts not shown in the drawing. The edges of the metal rim 18 are beveled on the outer side, and annular flange-rings are provided having outer parts 19 which fit around said beveled edges of the tread-rim, extending slightly beyond the sides of the hard band 17 of the tread-member, and inner parts 20 which extend inwardly from the tread-rim 18 and are parallel with each other. The flange-parts 20 are perforate transversely at a number of places, and through said transverse openings are passed bolts 21 which are provided at their outer ends with nuts 22. By means of said bolts and nuts the annular flanges are clamped onto the edges of the tread-rim 18, and also clamp laterally the outer retaining-rings of the inner tire-body.

The inner tire-body is made up of a series of blocks or units of very soft rubber, arranged in such proximity to each other as to form a substantially continuous annular mass of resilient material which is disposed between the wheel-rim 10 and tread-rim 18, forming the sole connection therebetween, and being held under a predetermined compression by the retaining-rings therefor, as will hereinafter appear.

Each of the resilient blocks or units of the inner tire-body has a central spherical portion 23, cylindrical end-portions 24 extending from opposite ends of the spherical portion, and rectangular ribs or side-pieces 25 which extend longitudinally at opposite sides of the end-portions 24, as shown in Fig. 6. The lateral extent of the side-pieces 25 is such that the dimension of the block from side to side is the same as the diameter of the central spherical portion 23.

The described resilient blocks or units are assembled with the side-pieces 25 of the adjacent units contacting with each other, and the resulting tire-body is held in assembled formation by means of an outer pair of retaining-rings 26 and an inner pair of retaining-rings 27, said rings having formed in their adjacent faces sphero-segmental recesses for the spherical parts 23 of the resilient units, and cylindro-segmental transverse channels or grooves adapted to fit around the respective inner and outer sides of the cylindrical end-parts 24 of the resilient units. Each of the retaining-rings is substantially U-shaped in transverse section, except as modified by the said recesses and channels, the outer rings 26 having flanges 28 and 29 extending outwardly from the lateral edges thereof and engaging the inner surface of the tread-rim 18, while the inner rings 27 have flanges 30 and 31 extending inwardly from their lateral edges and fitting onto the wheel-rim 10. The flanges 30 and 31 of the inner retaining-rings are provided with notches which fit over the ribs 12 on the rim 10, said ribs thus serving to hold said rings in fixed circumferential relation to each other and to the wheel. The flanges 28 and 29 of the outer retaining-rings have transverse openings for the bolts 21, the same being arranged circumferentially so that the bolts pass between the outer parts of adjacent pairs of the swelled portions which form the recesses for the spherical parts of the resilient units, as shown in Figs. 3, 4 and 5.

By means of the bolts 21 and nuts 22 the outer retaining-rings 26 are drawn together laterally so that their adjacent flanges 29 are engaged with each other, and said bolts also serve to hold the pair of rings in fixed circumferential relation to each other, so that the recesses for the resilient units will be properly matched. The inner retaining-rings 27 are forced together laterally by means of the nuts 14 and washers 15, the latter being pressed against the outer flange 30 of the one ring, while the corresponding flange 30 of the other ring rests against the flange 11 of the wheel-rim 10. The ribs 12 hold the inner pair of rings 27 in fixed circumferential relation to each other, as before mentioned.

The resilient units of the inner tire-body, and the recesses in the retaining-rings for the parts 23, are so proportioned to each other that in assembling the tire the said spherical parts 23 will fill the recesses therefor in the rings when the flanges 29 and 31 of the respective pairs of rings are adjacent to each other but before said flanges 29 and 31 are in engagement. Then, as the nuts 14 and 22 are tightened down to press said flanges 29 and 31 together laterally, the spherical parts 23 are compressed, and the same cause also a certain compression of the parts 24 and 25, by tending to bulge outwardly at the sides thereof where they are not confined in the sphero-segmental recesses of the rings. Thus the parts may readily be placed in the partly assembled relation at which the flanges 29 and 31 of the pairs of retaining-rings are separated, and the completion of the assembly, resulting from the drawing of the rings together laterally, places all parts of the tire-body under compression. The compressed resilient material forms the sole connection between the inner and outer retaining-rings, and consequently between the wheel-rim and tread-rim, and thus has the maximum possible capability for absorbing or cushioning the jars and vibration resulting from the movement of the wheel over rough surfaces. The lateral relation of the inner and outer rings is yieldably maintained by the inter-engagement of the spherical parts 23 in the recesses therefor, while the circumferential relation of the rings is yieldably maintained by the interengagement both of the spherical parts 23 and of the cylindrical parts 24 with the corresponding recesses and channels of the retaining-rings.

It will be obvious that the resilient tread 16 serves a part of the function of a pneumatic tire, in that it is indentable locally and will thus enable the wheel to pass over small obstructions without lifting the whole tire; while the compression of the inner tire-body formed by the resilient units has somewhat the effect of the inflation of a pneumatic tire. The inner tire-body may be made of very soft and springy rubber and still be capable of sustaining great weight, because the pressure thereon resulting from weight upon the wheel is distributed among a large number of the resilient units, or substantially all of those below the plane of the wheel-axis at any moment, such distribution of the weight or pressure upon the units being occasioned by the non-deformability of the composite ring formed by the tread-rim 18, the flange-portion 19 and 20, and the outer retaining-rings 26, all of which are rigidly connected in the assembled structure. It may be noted that the side-pieces 25 of the resilient units, by fitting together at the sides of the space between the inner and outer retaining-rings, effectually exclude all foreign matter from said space, so that the inner portions of the units are protected from injury and deterioration and will have a maximum durability.

Now, having described my invention, what I claim and desire to secure by Letters Patent is:

1. In a tire for vehicle wheels, the combination with a wheel-rim, and an outer non-deformable metal tread-rim having a solid tread of resilient material secured thereon, of a tire-body disposed intermediate of said wheel-rim and tread-rim and comprising a series of blocks of soft resilient material each having a central spherical portion and laterally projecting cylindrical portions, and inner and outer retaining-rings disposed respectively between the tire-body and the tread-rim and between the tire-body and wheel-rim and held in fixed lateral and circumferential relation thereto, the spherical and cylindrical portions of the resilient blocks being interengaged with parts of the retaining-rings, and the wheel-rim and tread-rim being unconnected with each other except through the medium of said resilient blocks.

2. In a tire for vehicle wheels, the combination with a wheel-rim, and an outer tread-rim disposed about the wheel-rim in spaced radial relation thereto, of an outer pair of retaining-rings fitting within the tread-rim, flange-rings disposed at the lateral sides of said tread-rim and retaining-rings, means for clamping said flange-rings onto the tread-rim and for holding said retaining-rings in fixed lateral relation to each other and to the tread-rim, an inner pair of retaining-rings disposed upon the wheel-rim and having portions interengaging laterally therewith, means for pressing said pair of retaining-rings together laterally and removably securing them upon the wheel-rim, the inner and outer pairs of retaining-rings having recesses and transverse channels in the adjacent faces thereof, and a tire-body of resilient material held under compression between the inner and outer pairs of retaining-rings and fitting into the recesses and channels thereof to yieldably limit relative movement thereof laterally, circumferentially and radially of the wheel.

3. In a tire for vehicle wheels, a plurality of solid blocks of resilient material each having a central spherical portion, cylindrical laterally-extending end-portions and rectangular longitudinal side-pieces, said resilient blocks being disposed in an annular series with the side-pieces thereof contacting, pairs of retaining-rings disposed inside and outside the ring formed by said annular series of the blocks and having their adjacent faces formed to fit thereon, and means for pressing the retaining-rings of each pair laterally toward each other to compress the spherical portions of the resilient blocks.

ARTHUR L. RUNYAN.

Copies of this patent may be obtained for five cents each, by addressing the "Commissioner of Patents, Washington, D. C."